L. R. CROUCH.
TRANSMISSION FOR MOTOR VEHICLES.
APPLICATION FILED DEC. 18, 1912.
1,207,715.
Patented Dec. 12, 1916.
2 SHEETS—SHEET 1.
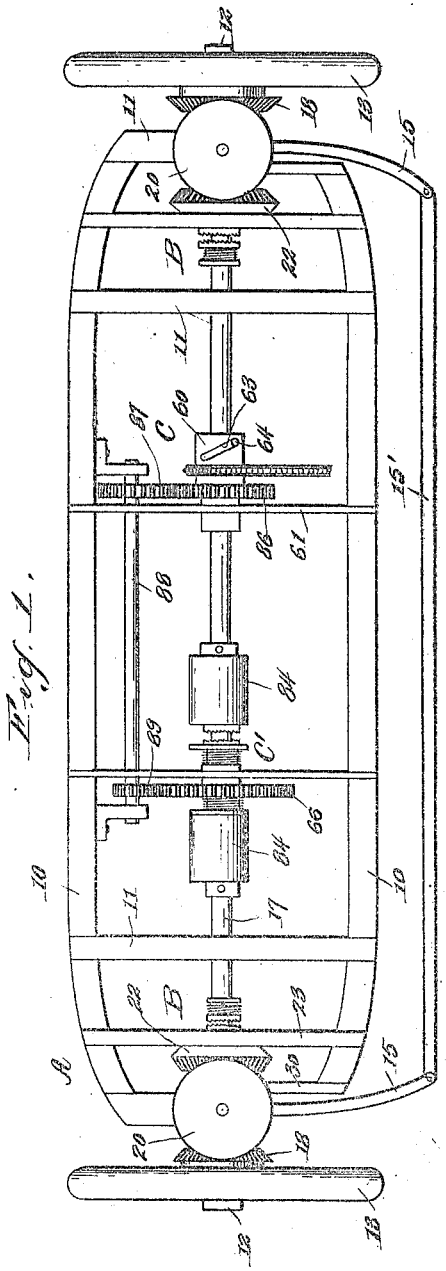
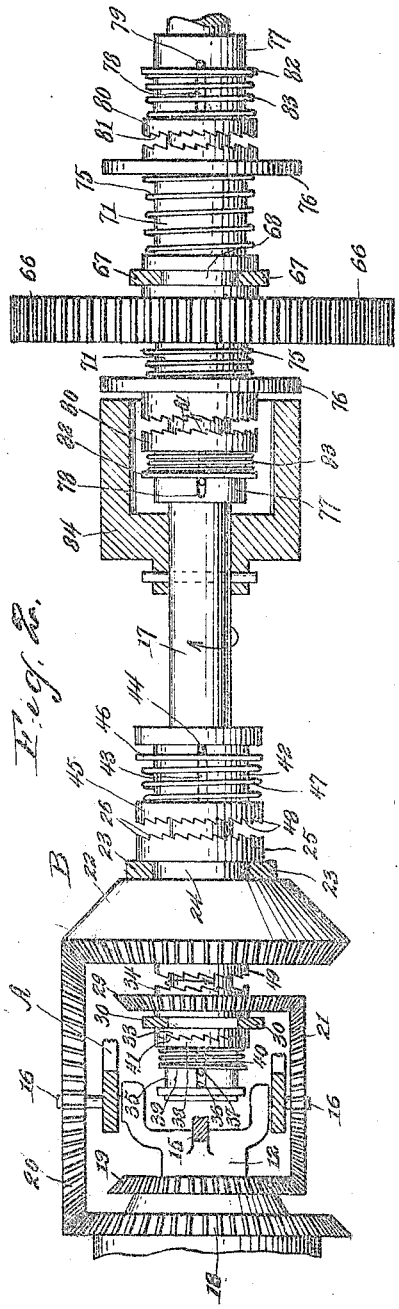
WITNESSES
INVENTOR

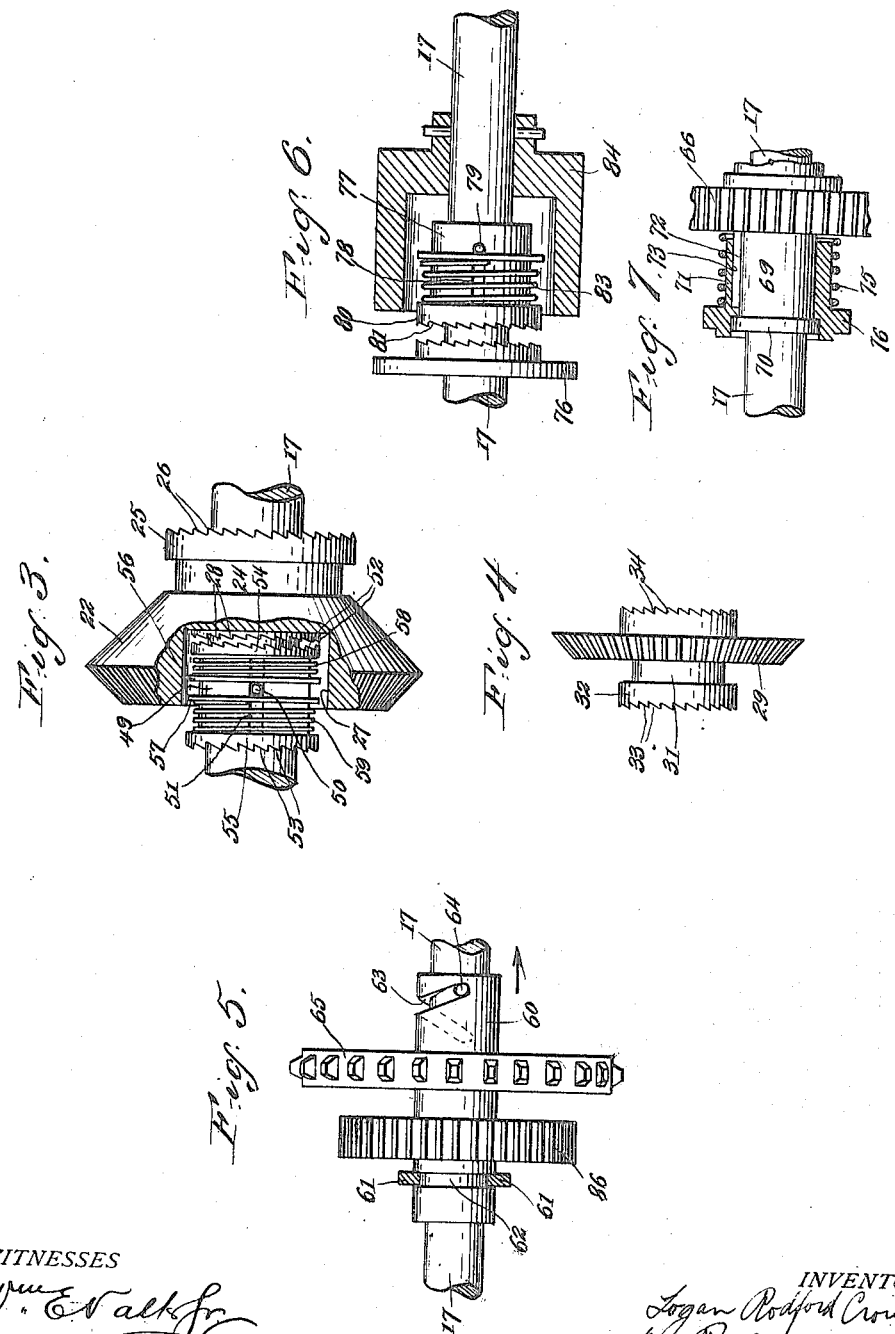

UNITED STATES PATENT OFFICE.

LOGAN RODFORD CROUCH, OF ULMER, IOWA.

TRANSMISSION FOR MOTOR-VEHICLES.

1,207,715.

Specification of Letters Patent.

Patented Dec. 12, 1916.

Application filed December 18, 1912. Serial No. 737,494.

*To all whom it may concern:*

Be it known that I, LOGAN RODFORD CROUCH, a citizen of the United States, residing at Ulmer, in the county of Sac and State of Iowa, have invented new and useful Improvements in Transmission for Motor-Vehicles, of which the following is a specification.

My present invention relates to transmission for motor vehicles, such as automobiles or tractors, having wheels bodily oscillatable about upright pivots near the hubs, for steering purposes.

The principal objects of my invention are to provide transmission for imparting movement of a motor to actuate wheels, whereby the vehicle may be moved and steered; to adapt such transmission for successful use to impart movement to the wheels for either forwarding or backing the vehicle; and, to provide transmission which embodies mechanism serving as a differential whereby one wheel of a pair may be rotated faster than the other to prevent sidewise dragging of its tread over the ground when the vehicle is turned.

Further objects of my invention are to provide transmission which is simple in construction, and hence, inexpensive to manufacture; that which is easily assembled and efficient for transmitting much power; and, elements adapted to take up shocks and provide for easy actuation of the mechanism for change of direction of movement of the vehicle.

Other objects of my invention will appear in the following detailed description, taken in connection with the accompanying drawings, forming a part of this specification, and in which drawings:

Figure 1 is a plan view of an axle structure of a vehicle chassis embodying my invention. Fig. 2 is an enlarged detail, partly in section and partly in elevation, of a portion of such structure. Fig. 3 is a view in elevation, with a part broken away to disclose details, showing a portion of the mechanism serving as means for imparting movement to one of the vehicle wheels. Fig. 4 is a side elevation of a bevel gear and clutches forming a part of the mechanism mentioned in connection with Fig. 3. Fig. 5 is a plan view showing details of mechanism for imparting movement of a motor to the drive shaft of the vehicle. Fig. 6 is a detail view partly in elevation and partly in section illustrating the means employed for the purpose of permitting the checking of the rotary motion of the drive shaft upon sliding movement thereof. Fig. 7 is a detail view partly in elevation and partly in section of several of the parts illustrated in Fig. 6.

Similar characters refer to similar parts throughout the several views.

In the drawings, A designates a suitable frame comprising elongated members 10 to be disposed transversely of the vehicle, and cross bars 11. This frame forms that part of the vehicle chassis for imposing the load on the main frame members, upon the wheel axles.

The frame A carries steering axles 12, of the well known type, upon which are mounted wheels 13. These axles are each pivoted to swing about the axis of an upright stud 16, carried by frame A, so that each wheel 13 is bodily oscillatable about such upright axis, and the usual steering arm 15 may extend from the stud embracing a portion of the axle, the arms of both of the wheels being connected by rod 15′ in the usual way. By this construction, the wheels 13 may be oscillated simultaneously, the arms 15 being set at the proper steering angle, as is well known to those skilled in the art, so that neither of the wheels will skid due to rounding a curve. A drive shaft of the transmission, is designated by 17 and is revolubly carried by cross bars 11 of frame A, and reciprocable with respect thereto.

Reversible mechanism, designated generally by B, is provided for imparting movement of shaft 17 to the wheels, in one direction, but permitting the latter to move faster than the former as for rounding curves, to prevent sidewise dragging of its tread over the ground, when the vehicle is turned. Suitable mechanism, designated generally by C, is provided for imparting movement of a motor, (not shown in the drawings), to shaft 17 and adapted to move the latter longitudinally upon reversal of the direction of rotation of the drive element of such mechanism. Mechanism C may include means C′ for retarding circumferential movement of the shaft 17 while being moved longitudinally, to permit of easy and successful operation of mechanism B.

Referring first to mechanism B, it preferably includes two coaxial bevel gears 18 and 19, the former having the larger diameter, both of which are revoluble with wheel 13. Comeshing with gears 18 and 19 are second gears 20 and 21, respectively, having common axes coincident with the axes of studs 16. Freely mounted on shaft 17 is a bevel gear 22 comeshing with gear 20, and retained against movement longitudinally of frame A, as by stays 23 fitting into an annular groove 24 formed in an extension 25 of said gear. As clearly shown in Fig. 3, gear 22 is provided with ratchet teeth 26 formed on extension 25, and has a recess 27 in its face opposite to teeth 26, at the bottom of which recess are second ratchet teeth 28. The provision of a recess 27 is desirable, although not essential, in order to condense the mechanism. A second bevel gear 29 is also freely mounted on shaft 17 intermediate gear 22 and steering axles 12, this gear 29 comeshing with gear 21. The gear 29 is retained against movement longitudinally of frame A as by stays 30 fitting into an annular groove 31 formed in an extension 32 laterally of gear 29 and preferably integral therewith. Ratchet teeth 33 are carried by extension 32 and second ratchet teeth, movable with gear 29, are provided adjacent the face of this gear opposite from teeth 33.

With particular reference to Fig. 2 of the drawings, it will be noted that the teeth 33 movable with gear 29 face the wheel 13, while the teeth 34 of gear 29 face the clutch 49. For coaction with the teeth 33 I provide a clutch member 35 mounted on shaft 17 so as to be movable longitudinally thereof. This clutch member is provided with an elongated slot 36 into which extends pin 37 carried by said shaft. Abutments 38 may be provided on this clutch member, and a washer 39 may abut against pin 37, with a spring 40 interposed between said washer and the abutments. By this construction, the clutch member is yieldably carried with shaft 17 when the latter is reciprocated, so that the teeth 41 of the clutch member are brought into operative relation to the teeth 33 of gear 29 so as to impart movement of shaft 17 to said gear in one direction. Likewise, the teeth 26 of gear 22 may have a clutch member 42 for coaction therewith, this clutch member being substantially like member 35 in that it is provided with an elongated slot 43, into which extends a pin 44 carried by shaft 17; an abutment 45; a washer 46 abutting against pin 44; and, a spring 47 interposed between abutment 45 and washer 46, this clutch member being provided with teeth 48 adapted to engage with teeth 26 for imparting movement to gear 22 in a direction counter to that for which clutch member 35 is designed.

A clutch member 49 may be provided, for coaction with the teeth 34 and 28 of gears 29 and 22, respectively, this clutch member being movable longitudinally of shaft 17, and circumferentially movable therewith through pin 50 which extends into an elongated slot 51 in the body portion of this clutch member. Teeth 52 are provided for coaction with teeth 28, while teeth 53 are provided for coaction with teeth 34. In this instance, flanges 54 and 55 may be provided adjacent teeth 52 and 53, respectively, and washers 56 and 57 may abut against pin 50, at opposite sides thereof, with coil springs 58 and 59 interposed between washers 56 and 57, and flanges 54 and 55, respectively. The clutch member 49 is so disposed that when the teeth of clutch member 35 engage with the teeth of gear 29, then its teeth 52 engage with the teeth of gear 22, and when the shaft 17 is moved longitudinally so that the teeth of clutch member 42 engage with the teeth 26 of gear 22, then the teeth 53 of clutch member 49 engage with the teeth 34 of gear 29.

While I have hereinbefore described mechanism B as comprising coacting gears 18, 20 and 22, and 19, 21 and 29, it is obvious that either set may be dispensed with without departing from the spirit or scope of my invention, two sets being preferable in order to equalize the pressure upon stud 14, or so that there is no tendency to materially throw the wheel 13 out of its normal plane with respect to the frame A.

Referring now to mechanism C, it preferably comprises a collar 60 loosely mounted on shaft 17 but retained against movement longitudinally of frame A, as by stays 61 extending into an annular groove 62 formed in said collar. This collar is also provided with a helical slot 63, into which extends a pin 64 rigid with shaft 17. By this construction, upon rotation of collar 60, and with pin 64 at one end of slot 63, movement will be imparted to shaft 17, however, if collar 60 is moved in a counter direction the pin 64 must move relative to slot 63 until it abuts against the other end of the slot, before movement of said collar is successfully imparted to the shaft 17. This action requires the shaft 17 to move longitudinally, inasmuch as the collar 60 is retained against such movement by the stays 61. A suitable wheel 65, such as a sprocket wheel, may be rigid with collar 60 to facilitate rotation of the latter, from any suitable motor, (not shown in the drawings).

Inasmuch as it is desirable that the shaft 17 not rotate as rapidly as it moves longitudinally, and so that the teeth of the clutches may be brought into successful engagement without a destructive impact, the mechanism C' may be provided. This mechanism, as disclosed, includes a gear wheel 66 loosely mounted on shaft 17 but retained against movement longitudinally of frame A, as by stays 67 extending into an annular groove 68 formed in the hub of said wheel. The wheel also carries with it collar portions 69 about the shaft 17 and terminating in flanges 70. Each collar 69 carries a clutch member 71 which is circumferentially movable with wheel 66 as through keys 72 extending into key-ways 73 formed in the internal periphery of the clutch member. The clutch members are so disposed that their teeth face in opposite directions, and they are yieldably forced to contact with flanges 70 as by springs 75. Each clutch member is also provided with a flange 76 extending beyond the teeth 74, the purpose of which will be subsequently set forth.

For coaction with each clutch member 71 is a clutch member 77 substantially like member 35 in that it is provided with an elongated slot 78, through which extends a pin 79 rigid with shaft 17; an abutment 80 adjacent the teeth 81 for coaction with the teeth of its coacting clutch member; a washer 82 abutting against pin 79; and, a spring 83 interposed between abutment 80 and washer 82. By this construction, the clutch member 77 is circumferentially movable with shaft 17 and yieldably forced toward its coacting clutch member. Adjacent each member 77 is an abutment 84, preferably in the form of a cup adapted to receive such member, this abutment being rigid with shaft 17 as through pin 85. This abutment is adapted to coöperate with the flange 76 of the collar 69, the clutch member it is adjacent to coöperates with. In order that the wheel 66 may receive movement from collar 60 but have less circumferential speed than said collar, a gear 86 is provided, rigid with the latter. This gear 86 comeshes with a gear 87 rigid with shaft 88, carried by framework A and disposed with its axis longitudinally of shaft 17. On shaft 88 is a pinion 89 which comeshes with gear 66. Thus, as collar 60 rotates, its movement is imparted to gear 66, through reducing gears 86 and 87, and pinion 89.

When assembling the several mechanisms, abutments 84 are so disposed that when any of the clutch members of mechanism B are in operative relation to each other for imparting movement of shaft 17 to the vehicle wheel, said abutments force clutch members 71 and 77 out of engagement, so that the wheel 66 in no way materially retards movement of shaft 17.

The operation of the transmission is as follows: Assuming that, as disclosed in Fig. 2 of the drawings, shaft 17 rotates in the direction indicated by an arrow positioned intermediate the length of Fig. 2, and clutch members 35 and 49 engage with the teeth of gears 29 and 22, respectively, as shown in Figs. 2 and 3 of the drawings, then movement is imparted to wheel 13 in a counter direction, through the comeshing bevel gears. When it is desired to reverse movement of the vehicle, the collar 60 is rotated in a counter direction. Immediately pin 64 moves in slot 63, which action moves shaft 17 in the direction indicated by an arrow in Fig. 5 of the drawings. This permits the clutch members 11 to engage with the members 69 and the shaft 17 is then rotated in the direction counter to that hereinbefore set forth at a slower rate of speed than the collar 60 in that the wheel 66 that is carried by one of the members 69 is thus keyed to rotate with the shaft because of the engagement of one of the clutch members 77 with one of the members 69 and the shaft is thus driven by means of the intermeshing gears 86, 87, 89 and 66 which, because of their relative sizes accomplish the slower rotation of the shaft than the rotation of the collar 60. This slow movement of shaft 17 permits the clutches of mechanism B to become disengaged, and other clutches, to engage, in order that the wheels 13 may be moved in a direction counter to that hereinbefore described. As soon as these clutches are in successful engagement, the abutments 84 force the clutches of mechanism C' out of engagement, and the shaft 17 moves with collar 60 as soon as its pin 64 reaches the other end of slot 63.

It is to be noted, that when this transmission is embodied with a motor vehicle, and the wheels 13 are turned to cause the vehicle to move in a curved path, one wheel may move faster than the other inasmuch as the clutch members 35, 49 and 42 yieldably engage with the ratchet teeth of gears 22 and 29.

Changes in details may be made without departing from the spirit or scope of my invention; but,

I claim:—

1. In transmission of the character described, the combination of a frame, two wheels carried thereby and bodily oscillatable about upright axes, a drive shaft, said wheels having their horizontal axes coincident with the axis of the shaft and mechanism for imparting movement of said shaft to said wheels at a positive velocity ratio, but permitting the latter to rotate faster than the ratio provided for by said shaft, including gear wheels turnable with the shaft, gear wheels rotatable with the first mentioned wheels and means to drive the gear wheels of the first mentioned wheels from the gear wheels of the shaft.

2. In transmission of the character described, the combination of a frame, two wheels carried thereby and bodily oscillatable about upright axes, a drive shaft, said wheels having their horizontal axes coincident with the axis of the shaft, and mechanism for imparting movement of said shaft in either direction to said wheels at a positive velocity ratio, but permitting the latter to rotate faster than the ratio provided for by said shaft, including gear wheels turnable with the shaft, gear wheels rotatable with the first mentioned wheels and means to drive the gear wheels of the first mentioned wheels from the gear wheels of the shaft.

3. In transmission of the character described, the combination of a frame, two wheels carried thereby, a rotatable shaft carried by said frame intermediate the planes of said wheels and reciprocable longitudinally, means for imparting movement of said shaft to said wheels at a positive velocity ratio, but permitting the latter to rotate faster than the ratio provided for from said shaft, said means being reversible by longitudinal movement of said shaft, to positively rotate the wheels in the reverse direction, and means for reciprocating said shaft, substantially as and for the purpose set forth.

4. In transmission of the character described, the combination of a frame, two wheels carried thereby and bodily oscillatable about upright axes, a rotatable shaft carried by said frame intermediate the planes of said wheels and reciprocable longitudinally, means for imparting movement of said shaft to said wheels at a positive velocity ratio, but permitting the latter to rotate faster than the ratio provided for from said shaft, said means being reversible by longitudinal movement of said shaft, and means for reciprocating said shaft, substantially as and for the purpose set forth.

5. In transmission of the character described, the combination of a frame, two wheels carried thereby, a revoluble shaft carried by said frame intermediate the planes of said wheels and reciprocable longitudinally, means for imparting movement of said shaft to said wheels at a positive velocity ratio, but permitting the latter to rotate faster than the ratio provided for from said shaft, said means being reversible by longitudinal movement of said shaft to positively rotate the wheels in the opposite direction, and means for imparting circumferential movement to said shaft and capable of reciprocating the same, substantially as and for the purpose set forth.

6. In transmission of the character described, the combination of a frame, two wheels carried thereby, a revoluble shaft carried by said frame intermediate the planes of said wheels reciprocable longitudinally, means, including clutches, for imparting movement of said shaft to said wheels at a positive velocity ratio, but permitting the latter to rotate faster than the ratio provided for from said shaft, said means being reversible by longitudinal movement of said shaft, means for imparting circumferential movement to said shaft and capable of reciprocating the same, and means for retarding circumferential movement of said shaft while being reciprocated, substantially as and for the purpose set forth.

7. In transmission of the character described, the combination of a frame, two wheels carried thereby, a rotatable shaft carried by said frame intermediate the planes of said wheels and reciprocable longitudinally, means for imparting movement of said shaft to said wheels at a positive velocity ratio, but permitting the latter to rotate faster than the ratio provided for through said shaft, said means being reversible by longitudinal movement of said shaft, a collar about said shaft having a helical slot, a pin extending into said slot and rigid with said shaft, and means preventing lateral movement of said collar, substantially as and for the purpose set forth.

8. In transmission of the character described, the combination of a frame, two wheels carried thereby, a rotatable shaft carried by said frame intermediate the planes of said wheels and reciprocable longitudinally, means for imparting movement of said shaft to said wheels at a positive velocity ratio, but permitting the latter to rotate faster than the ratio provided for through said shaft, said means being reversible by longitudinal movement of said shaft, a collar about said shaft having a helical slot, a pin extending into said slot and rigid with said shaft, means preventing lateral movement of said collar, a wheel loosely mounted on said shaft but retained against longitudinal movement with respect to said frame, clutch members, at opposite sides of said wheel, rotatable therewith but yieldable toward its plane, coacting clutch members circumferentially movable with said shaft and yieldable in a direction away from the plane of said wheel, abutments adapted to throw said clutch members out of engagement prior to said shaft reaching its limit of reciprocation, and speed reducing gears between said collar and wheel, substantially as and for the purpose set forth.

9. In transmission of the character described, the combination of a frame, two wheels carried thereby, a rotatable shaft carried by said frame intermediate the planes of said wheels and reciprocable longitudinally, means for imparting movement of said shaft to said wheels at a positive velocity ratio, but permitting the latter to rotate faster than the ratio provided for through said shaft, said means being reversible by longitudinal movement of said shaft, means for imparting rotation to said shaft but permitting lost circumferential movement between itself and said shaft when the direction of rotation of the power applied is reversed, and to move said shaft longitudinally, and mechanism for retarding circumferential movement of said shaft during its phase of longitudinal movement, substantially as and for the purpose set forth.

10. In transmission of the character described, the combination of a frame, a wheel revolubly carried thereby and bodily oscillatable about an upright axis, a revoluble shaft carried by said frame and capable of movement toward or from said wheel, a bevel gear movable with said wheel and coaxial therewith, a second bevel gear comeshing with said first gear and coaxial with the pivot of oscillation of said wheel, a third bevel gear loosely mounted on said shaft and comeshing with said second gear, said third gear having oppositely disposed ratchet teeth at opposite faces thereof, and two clutch members circumferentially movable with said shaft and having ratchet teeth to engage with the ratchet teeth of said third gear, said clutch members being spaced relative to each other so that they may be alternately engaged with their coacting teeth on the third gear by reciprocation of said shaft, substantially as and for the purpose set forth.

11. In transmission of the character described, the combination of a frame, a wheel revolubly carried thereby and bodily oscillatable about an upright axis, a revoluble shaft carried by said frame and capable of movement toward or from said wheel, a bevel gear movable with said wheel and coaxial therewith, a second bevel gear comeshing with said first gear and coaxial with the pivot of oscillation of said wheel, a third bevel gear loosely mounted on said shaft and comeshing with said second gear, said third gear having oppositely disposed ratchet teeth at opposite faces thereof, two clutch members circumferentially movable with said shaft, but movable longitudinally thereof, and having ratchet teeth to engage with the ratchet teeth of said third gear, said clutch members being spaced relative to each other so that they may be alternately engaged with their coacting teeth on the third gear by reciprocation of said shaft, and means for yieldably forcing each of said clutch members toward the plane of said third gear, substantially as and for the purpose set forth.

12. In transmission of the character described, the combination of a frame, a wheel revolubly carried thereby and bodily oscillatable about an upright axis, a revoluble shaft carried by said frame and capable of movement toward or from said wheel, a pair of coaxial bevel gears movable with said wheel, one of said gears being larger than the other, a second pair of bevel gears comeshing with the gears of said first pair and coaxial with the pivot of oscillation of said wheel, a third pair of bevel gears comeshing with the gears of said second pair, said third gears being loosely mounted on said shaft and each having oppositely disposed ratchet teeth on opposite faces, a clutch member intermediate said third gears, circumferentially movable with said shaft and having ratchet teeth on opposite faces to coact with the ratchet teeth of said third gears facing each other, means normally centering said clutch member to be yieldable in either direction longitudinally of said shaft, two clutch members, one adjacent each of the outer faces of said third gears, circumferentially movable with said shaft and having teeth to coöperate with the ratchet teeth at the outer faces of the said gears, and means for yieldably forcing the said last-mentioned clutch members toward the planes of their adjacent gears, substantially as and for the purpose set forth.

LOGAN RODFORD CROUCH.

Witnesses
JOHN KRENZIEN,
C. H. TOWNSEND.